US010432954B2

(12) United States Patent
Chen et al.

(10) Patent No.: US 10,432,954 B2
(45) Date of Patent: Oct. 1, 2019

(54) VIDEO ENCODER, VIDEO ENCODING SYSTEM AND VIDEO ENCODING METHOD

(71) Applicant: NVIDIA CORPORATION, Santa Clara, CA (US)

(72) Inventors: Jianjun Chen, Shanghai (CN); Xi He, Shanghai (CN); Chunfeng Yang, Shanghai (CN); Zejun Hu, Shanghai (CN)

(73) Assignee: NVIDIA CORPORATION, Santa Clara, CA (US)

( * ) Notice: Subject to any disclaimer, the term of this patent is extended or adjusted under 35 U.S.C. 154(b) by 37 days.

(21) Appl. No.: 15/231,624

(22) Filed: Aug. 8, 2016

(65) Prior Publication Data
US 2017/0041617 A1 Feb. 9, 2017

(30) Foreign Application Priority Data
Aug. 7, 2015 (CN) .......................... 2015 1 0484942

(51) Int. Cl.
*H04B 1/66* (2006.01)
*H04N 19/436* (2014.01)

(52) U.S. Cl.
CPC ................... *H04N 19/436* (2014.11)

(58) Field of Classification Search
CPC .... H04N 19/176; H04N 19/107; H04N 19/61; H04N 19/70; H04N 19/174
(Continued)

(56) References Cited

U.S. PATENT DOCUMENTS 6,909,745 B1* 6/2005 Puri ....................... H04N 19/70
348/384.1
2010/0128797 A1* 5/2010 Dey ..................... H04N 19/176
375/240.24
(Continued)

FOREIGN PATENT DOCUMENTS

| CN | 101150719 A | * | 3/2008 |
| CN | 101150719 A | | 3/2008 |
(Continued)

OTHER PUBLICATIONS

Office Action from Chinese Patent Application No. 201510484942.6, dated Oct. 8, 2018.

*Primary Examiner* — Jamie J Atala
*Assistant Examiner* — Masum Billah
(74) *Attorney, Agent, or Firm* — Zilka-Kotab, PC

(57) ABSTRACT

The present disclosure discloses a video encoder, a video encoding system and a video encoding method. The video encoder comprises a logic control module and an encoding module. Wherein, the logic control module is configured to receive a control command sent from an external controller for encoding a specified portion of each frame of image, and send the control command to the encoding module; and the encoding module is configured to receive the control command from the logic control module, and encode the specified portion of each frame of image according to the control command, so as to cooperate with a plurality of other video encoders to complete encoding each frame of image. By employing the video encoder, video encoding system and video encoding method according to the present disclosure, each frame of image can be accomplished jointly by a plurality of video encoders, thus significantly reducing the encoding time, diminishing the encoding latency, and achieving real-time encoding of high-definition video (Continued)

sources, in particular, video sources with a resolution ratio of 4 k or above.

18 Claims, 3 Drawing Sheets

(58) Field of Classification Search
USPC .................................................. 375/240, 24
See application file for complete search history.

(56) References Cited

U.S. PATENT DOCUMENTS

| | | | |
|---|---|---|---|
| 2014/0112394 A1* | 4/2014 | Sullivan | H04N 19/46 375/240.26 |
| 2015/0264351 A1* | 9/2015 | Miyoshi | H04N 19/107 375/240.13 |
| 2016/0165233 A1* | 6/2016 | Liu | G06T 11/60 382/251 |

FOREIGN PATENT DOCUMENTS

| | | |
|---|---|---|
| CN | 101267564 A | 9/2008 |
| CN | 101897190 A | 11/2010 |

* cited by examiner

VIDEO ENCODER, VIDEO ENCODING SYSTEM AND VIDEO ENCODING METHOD

FIELD OF INVENTION

The present disclosure relates generally to the video communication field, and more particularly to a video encoder, a video encoding system and a video encoding method.

BACKGROUND

Multimedia content creating and distributing operations generally include video encoding. A video encoding process is usually computation-intensive. As a result, the video encoding process may be very time-consuming. For example, it may take dozens of hours for a video encoder to encode a high-quality high-definition movie. This is especially true when it comes to high resolution and high frame rate scenes where it is hard to process with one encoder and a relatively major delay may occur. Since the time for video encoding is an important factor contributing to a successful multimedia content creation and distribution pipelines, systems and techniques for reducing video encoding time will be of much use.

SUMMARY OF THE INVENTION

A series of simplified concepts are to be introduced in the Summary of the Invention and further explained in detail in the Detailed Description. The Summary of the Invention is not intended for any attempt at defining the critical features and essential technical features of the technical solutions for which protection is sought by the present disclosure, still less intended for determining the protection scope of the technical solution for which protection is sought by the present disclosure.

In one aspect, the present disclosure discloses a video encoder, comprising a logic control module and an encoding module, wherein the logic control module is configured to receive a control command sent from an external controller for encoding a specified portion of each frame of image, and send the control command to the encoding module; the encoding module is configured to receive the control command from the logic control module, and encode the specified portion of each frame of image according to the control command, so as to cooperate with a plurality of other video encoders to complete encoding each frame of image.

In one embodiment of the present disclosure, the encoding module comprises an inter-frame prediction module, an intra-frame prediction module, a pattern judgment module and an entropy encoding module, wherein, the inter-frame prediction module and the intra-frame prediction module are both configured to treat the specified portion of each frame of image as a frame of image data.

In one embodiment of the present disclosure, the inter-frame prediction module and the intra-frame prediction module each has a respective register value that is set based on the image size of the specified portion of each frame of image.

In one embodiment of the present disclosure, the inter-frame prediction module is configured to use the entire previous frame of image that has been encoded as a reference frame during inter-frame prediction.

In one embodiment of the present disclosure, a specified portion of each frame of image encoded in the video encoder is defined as a strip, a border of which does not require deblocking filtering.

In one embodiment of the present disclosure, the strip encoded by the video encoder is similar in size to a strip encoded by each of the plurality of other video encoders cooperating with the video encoder in completing the encoding.

In one embodiment of the present disclosure, the video encoder is realized by configuration of an NVENC hardware encoding engine.

In one embodiment of the present disclosure, the video encoder can be applied in a GP100 graphics processing unit.

In another aspect, the present disclosure further discloses a video encoding system, comprising a controller, a plurality of video encoders and a memory, wherein, the controller is configured to send a control command to each of the plurality of video encoders, so as to control the plurality of video encoders such as to jointly complete encoding each frame of image; and each of the plurality of video encoders is configured to receive the control command, read a portion of data of a frame of image from the memory based on the control command, encode the read data, and write the encoded data to the memory.

In one embodiment of the present disclosure, a portion of data of a frame of image encoded by each of the plurality of video encoders is defined as a strip, and each strip encoded by each of the plurality of video encoders is roughly of a same size.

In one embodiment of the present disclosure, the video encoder comprises a logic control module and an encoding module, wherein, the logic control module is configured to receive the control command sent from the controller, and send the control command to the encoding module; and the encoding module is configured to receive the control command from the logic control module, and encode a specified portion of each frame of image according to the control command, so as to cooperate with the others of the plurality of video encoders to complete encoding each frame of image.

In one embodiment of the present disclosure, the encoding module comprises an inter-frame prediction module, an intra-frame prediction module, a pattern judgment module and an entropy encoding module, wherein, the inter-frame prediction module and the intra-frame prediction module are both configured to treat the specified portion of each frame of image as a frame of image data.

In one embodiment of the present disclosure, the inter-frame prediction module and the intra-frame prediction module each has a respective register value that is set based on the image size of the specified portion of each frame of image.

In one embodiment of the present disclosure, the inter-frame prediction module is configured to use the entire previous frame of image that has been encoded as a reference frame during inter-frame prediction.

In one embodiment of the present disclosure, a border of a strip encoded in each of the plurality of video encoders does not require deblocking filtering.

In further another aspect, the present disclosure also discloses a video encoding method, comprising dividing each frame of image into a plurality of strips; distributing the plurality of strips to a plurality of video encoders for encoding; and integrating the plurality of encoded strips into a frame of encoded image.

In one embodiment of the present disclosure, the number of the strips is equal to that of the video encoders.

In one embodiment of the present disclosure, the dividing each frame of image into a plurality of strips further comprises dividing each frame of image into a plurality of strips along the horizontal direction.

In one embodiment of the present disclosure, borders of the plurality of strips do not require deblocking filtering.

In one embodiment of the present disclosure, the video encoder comprises a logic control module and an encoding module, wherein, the logic control module is configured to receive a control command sent from an external controller for encoding a specified strip of each frame of image, and send the control command to the encoding module; and the encoding module is configured to receive the control command from the logic control module, and encode the specified strip of each frame of image according to the control command, so as to cooperate with the others of the plurality of video encoders to complete encoding each frame of image.

By employing the video encoder, video encoding system and video encoding method according to the present disclosure, each frame of image can be accomplished jointly by a plurality of video encoders, thus significantly reducing the encoding time, diminishing the encoding latency, and achieving real-time encoding of high-definition video sources, in particular, video sources with a resolution ratio of 4 k or above.

BRIEF DESCRIPTION OF THE DRAWINGS

The accompanying drawings are herein provided as part of the present disclosure to facilitate understanding of the invention. The drawings illustrate the embodiments of the present disclosure and the depictions thereof for the purpose of explaining the principles of the present disclosure. In the drawings.

DETAILED DESCRIPTION

In the following discussion, great details are presented so as to provide a more thorough understanding of the present disclosure. However, the present disclosure may be implemented without one or more of these details as would be apparent to one of ordinary skill in the art. Certain examples are illustrated without elaborate discussion of technical features that would be within the purview of one of ordinary skill in the art so as to avoid confusion with the present disclosure.

For the sake of rendering thorough understanding of the present disclosure, detailed structures are to be proposed in the following depictions. Apparently, implementation of the present disclosure is not limited to the special details well known to those skilled the art. Preferred embodiments of the present disclosure are described as follows. However, the present disclose may also be implemented in manners in additions to these detailed depictions.

In the prior video encoding technology, a frame of image is generally encoded by one encoder. However, it is difficult for one encoder to meet the requirements in some application scenes for high resolution, high frame ratio and/or real-time processing.

Figure 1:
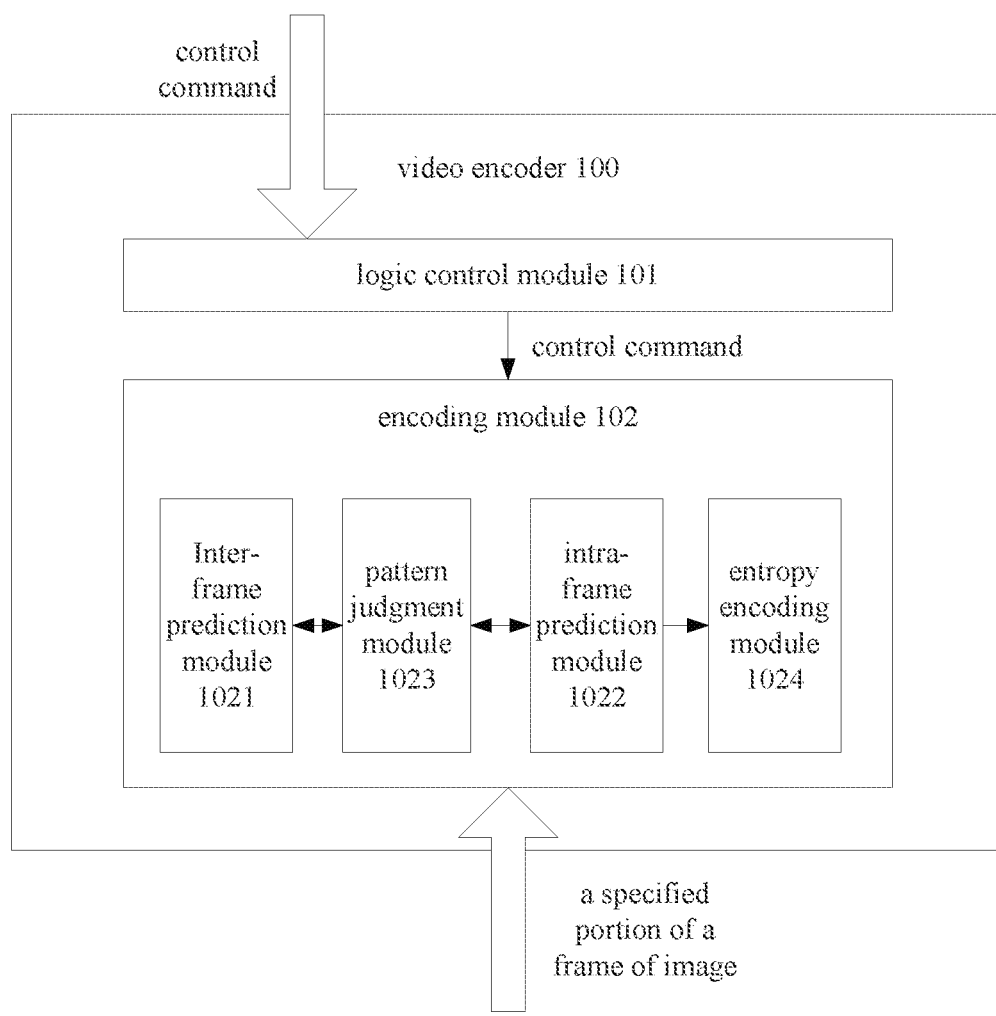
FIG. 1 is a structure diagram of a video encoder according to one embodiment of the present disclosure.

According to one aspect of the present disclosure, a video encoder is disclosed. FIG. 1 is a structure diagram of a video encoder 100 according to one embodiment of the present disclosure. As shown in FIG. 1, the video encoder 100 comprises a logic control module 101 and an encoding module 102. Wherein, the logic control module is configured to receive a control command sent from an external controller for encoding a specified portion of each frame of image, and send the control command to the encoding module 102; the encoding module 102 is configured to receive the control command from the logic control module 101, and encode the specified portion of each frame of image according to the control command, so as to cooperate with a plurality of other video encoders to complete encoding each frame of image. In this case, the plurality of other video encoders may be encoders having the same structure as the video encoder 100. Each video encoder 100, based on the received control command, reads a specified portion of a frame of image from an external memory, and encodes the specified portion of the frame of image, so that the encoding of this frame of image may be accomplished jointly by a plurality of video encoders, thus effectively reducing the encoding time, diminishing the encoding latency, and achieving real-time encoding of high-definition videos, in particular, video sources with a resolution ratio of 4 k or above. For example, one frame of image may be encoded by three video encoders 100 jointly, with each video encoder 100 performing encoding of a specified portion of the frame of image, for example, each video encoder 100 completes a third of the frame of image.

According to an embodiment of the present disclosure, the encoding module 102 may comprises an inter-frame prediction module 1021, an intra-frame prediction module 1022, a pattern judgment module 1023 and an entropy encoding module 1024. Wherein, the inter-frame prediction module 1021 performs inter-frame motion estimation and motion compensation, and the inter-frame prediction module 1021 is also configured to use the entire previous frame of image that has been encoded as a reference frame during inter-frame prediction; the intra-frame prediction module 1022 performs intra-frame encoding, and sends information to be encoded such as a final residual to the entropy encoding module 1024; the pattern judgment module 1023 selects an optimal prediction result from inter-frame prediction results and intra-frame prediction results, and returns the optimal prediction result to the inter-frame prediction module 1021 and the intra-frame prediction module 1022; the entropy encoding module 1024 encodes information like a prediction residual and writes the encoded result to an external register.

Wherein, the inter-frame prediction module 1021 and the intra-frame prediction module 1022 may both be configured to treat a specified portion of each frame of image as a frame of image data. For example, the inter-frame prediction module 1021 and the intra-frame prediction module 1022 are configured such that their respective register value is set based on the image size of the specified portion of each frame of image. As discussed in the above example, one frame of image may be encoded by three video encoders 100 jointly, with each video encoder 100 performing encoding of a specified portion of the frame of image, for example, each video encoder 100 completes a third of the frame of image. In this situation, the value of an image height and width register in the inter-frame prediction module 1021 and the intra-frame prediction module 1022 of each of the three video encoders 100 may be set based on the height and width of one third frame of image. In addition, in the inter-frame prediction module 1021 and the entropy encoding module 1024, the value of a macro block (MB) position register may be set based on the position of the macro block in the entire image. In this way, the encoding module 102 can treat the portion of a frame of image read thereby as an independent frame of image data, rather than a portion of a frame of image, and therefore, transmits a signal for the end of the current frame encoding upon finishing the encoding of the specified portion, hence achieving encoding of a frame of image with a plurality of encoders.

According to an embodiment of the present disclosure, a specified portion of each frame of image encoded in a video encoder 100 is defined as a strip, the border of which does not require deblocking filtering. Since each video encoder 100 only encodes a portion of a frame of image, in other words, pixel points of two borders of a frame of image are respectively located in two video encoders 100, the border of a strip encoded in a video encoder does not require deblocking filtering.

According to an embodiment of the present disclosure, a strip encoded by a video encoder is of about the same size as a strip encoded by each of a plurality of other video encoders cooperating with this video encoder in completion of encoding. As shown in the above example, three video encoders 100 jointly encode one frame of image, with each video encoder 100 responsible for encoding of a specified portion of the frame of image. The three video encoders may perform the same (for example, each video encoder 100 responsible for one third of the frame of image) or different amounts of encoding among one another. The encoding efficiency may be improved maximally by each video encoder 100 encoding a strip of roughly the same size as the others.

According to an embodiment of the present disclosure, the video encoder 100 may be realized by configuration of an NVENC hardware encoding engine. NVENC is an H.264 hardware encoding engine which can provide relatively high speed of encoding and transcoding, and can also provide a good performance-watt ratio.

According to an embodiment of the present disclosure, the video encoder 100 can be applied in a GP100 graphics processing unit. The GP100 graphics processing unit comprises three NVENC encoding engines, and by configuring each NVENC encoding engine as a video encoder 100 mentioned above, the three NVENC encoding engines in the GP100 graphics processing unit can achieve joint encoding of each frame of image, thus improving the encoding speed, reducing encoding time, and accomplishing real-time encoding of high-definition video sources, in particular, video sources with a resolution ratio of 4 k or above.

Figure 2:
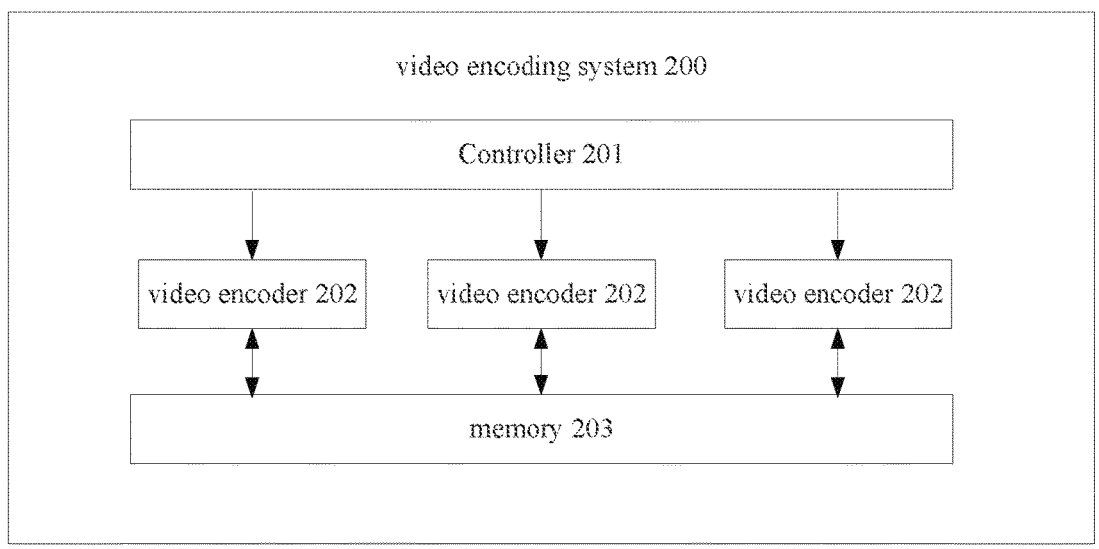
FIG. 2 is a structure diagram of a video encoding system according to one embodiment of the present disclosure.

According to another aspect of the present disclosure, a video encoding system is also disclosed. FIG. 2 is a structure diagram of a video encoding system 200 according to one embodiment of the present disclosure. As shown in FIG. 2, the video encoding system 200 comprises a controller 201, a plurality of video encoders 202 and a memory 203. Wherein, the controller 201 is configured to send a control command to each of the plurality of video encoders 202, so as to control the plurality of video encoders 202 as to achieve encoding jointly a frame of image; each of the plurality of video encoders 202 is configured to receive the control command, read a portion of data of a frame of image from the memory, encode the read data, and write the encoded data to the memory. In this case, each of the plurality of video encoders 202 may be of the same structure as the video encoders 100 shown in FIG. 1. For the sake of simplicity of description, the structure and working process of the video encoders 202 will not be introduced herein. Similar to the preceding examples, in one example, the video encoding system 200 may comprise three video encoders 202, wherein each video encoder may, based on the control command of the controller 201, read from the memory 203 and encode a specified portion of a frame of image. In this way, the three video encoders 202 in the video encoding system 200 may cooperate in completing the encoding of each frame of image.

According to an embodiment of the present disclosure, a portion of data of a frame of image encoded by each of the plurality of video encoders 202 may be defined as a strip, and each strip encoded by one of the plurality of video encoders 202 is of about the same size. As shown in the above example, the video encoding system 200 may comprise three video encoders 202, wherein each video encoder may, based on the control command of the controller 201, read from the memory 203 and encode a specified portion of a frame of image. The three video encoders 202 may perform the same (for example, video encoder 202 is responsible for one third of a frame of image) or different amounts of encoding. The encoding efficiency may be improved maximally if the strips respectively encoded by the video encoders 202 are similar in size.

According to an embodiment of the present disclosure, the video encoder 202 may be realized by configuration of an NVENC hardware encoding engine. The video encoding system 200 may be realized by a GP100 graphics processing unit. Wherein, the controller 201 may be realized by a GPU control center of the GP100 graphics processing unit, the plurality of video encoders 202 may be realized by the three NVENC hardware encoding engines of the GP100 graphics processing unit, and the memory 203 may be realized by a GPU video memory of the GP100 graphics processing unit.

A person of ordinary skill in the art would be able to appreciate that the above video encoding system 200 comprising three video encoders 202 is merely one embodiment, and the video encoding system may comprise video encoders 202 in other numbers to meet different encoding requirements. In addition, the video encoding system 200 may be realized by other graphics processing units (not a GP100 graphics processing unit).

Figure 3:
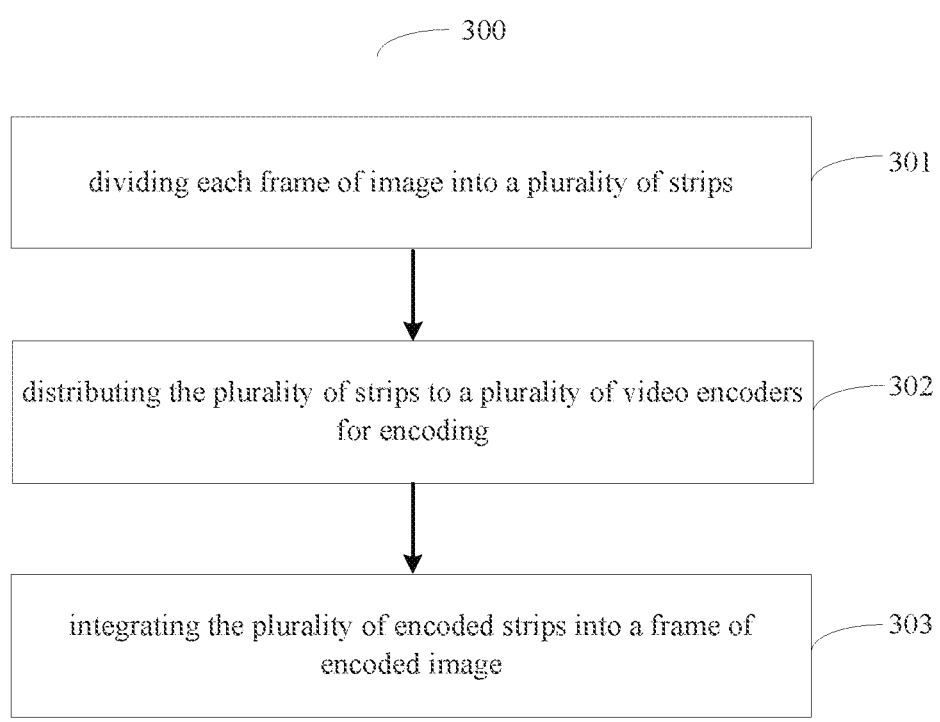
FIG. 3 is a flow chart of a video encoding method according to one embodiment of the present disclosure.

According to further another aspect of the present disclosure, a video encoding method is also disclosed. FIG. 3 is a flow chart of a video encoding method 300 according to one embodiment of the present disclosure. This video encoding method 300 comprises the following steps.

Step 301: dividing each frame of image into a plurality of strips;

Steps 302: distributing the plurality of strips to a plurality of video encoders for encoding; and Step 303: integrating the encoded plurality of strips into one encoded image.

The video encoder herein, for example, may adopt the structure of the video encoder 100 as shown in FIG. 1, so as to support the operation of one video encoder only encoding a portion of a frame of image. For the sake of simplicity of description, the structure and working process of the video encoders in the video encoding method 300 will not be described herein.

According to an embodiment of the present disclosure, the number of strips may be equal to the number of video encoders. For example, when three video encoders are involved, each frame of image may be divided into three strips, with each video encoder responsible for encoding one strip. The encoding efficiency may be improved maximally when each video encoder encodes the same amount of data.

According to an embodiment of the present disclosure, the dividing each frame of image into a plurality of strips may further comprise: dividing each frame of image into a plurality of strips along the horizontal direction. In addition, since each frame of image is divided into a plurality of strips, and pixel points of two borders of each frame of image are respectively located within two video encoders, borders of the plurality of strips do not require deblocking filtering.

By the video encoding method 300, encoding of a frame of image may be accomplished jointly by a plurality of video encoders. Each video encoder only needs to process a portion of the frame of image, which compared to one video encoder processing an entire frame of image effectively improves the encoding efficiency, and reduces encoding time.

The present disclosure has been illustrated through the above embodiments. However, it should be appreciated that the above embodiments are merely for illustrative and exemplary purposes, but not intended for limiting the present disclosure to the depicted embodiments. In addition, as could be understood by those skilled in the art, the present disclosure is not confined to the above embodiments, and according to the teachings in the present disclosure, more variations and modifications falling within the protection scope of the present disclosure may be made. The protection scope of the present disclosure shall be determined by the appended claims and the scope equivalent thereto.

What is claimed is:

1. A video encoding system, comprising a controller, a first video encoder, a second video encoder, and a memory, where the video encoding system:
   divides a frame of an image into a predetermined number of predetermined portions, where the predetermined number of the predetermined portions is based on a number of a plurality of video encoders within the video encoding system;
   sends, from the controller to a first video encoder of the plurality of video encoders, a command to encode a first predetermined portion of the frame of the image;
   sends, from the controller to a second video encoder of the plurality of video encoders, a command to encode a second predetermined portion of the frame of the image separate from the first predetermined portion of the frame of the image;
   retrieves from the memory, by the first video encoder, the first predetermined portion of the frame of the image;
   retrieves from the memory, by the second video encoder, the second predetermined portion of the frame of the image;
   encodes, by the first video encoder, the first predetermined portion of the frame of the image to create a first encoded portion of the frame of the image, wherein during the encoding of the first predetermined portion of the frame of the image by the first video encoder, a value of an image height and width register used by the first video encoder is set based on a height and width of the first predetermined portion of the frame of the image, and a value of a macro block (MB) position register used by the first video encoder is set based on a position of a macro block in the image;
   encodes, by the second video encoder, the second predetermined portion of the frame of the image to create a second encoded portion of the frame of the image different from the first encoded portion of the frame of the image, wherein during the encoding of the second predetermined portion of the frame of the image by the second video encoder, a value of an image height and width register used by the second video encoder is set based on a height and width of the second predetermined portion of the frame of the image, and a value of a macro block (MB) position register used by the second video encoder is set based on the position of the macro block in the image;
   writes, by the first video encoder, the first encoded portion of the frame of the image to the memory; and
   writes, by the second video encoder, the second encoded portion of the frame of the image to the memory.

2. The video encoding system according to claim 1, wherein:
   the first video encoder performs inter-frame motion estimation and motion compensation on the first predetermined portion of the frame of the image, utilizing an entire previous frame of the image that has been encoded as a reference frame, and
   the second video encoder performs inter-frame motion estimation and motion compensation on the second predetermined portion of the frame of the image, utilizing the entire previous frame of the image that has been encoded as the reference frame.

3. The video encoding system according to claim 1, wherein:
   the first video encoder performs intra-frame encoding utilizing the first predetermined portion of the frame of the image,
   the second video encoder performs intra-frame encoding utilizing the second predetermined portion of the frame of the image, and
   both the first video encoder and the second video encoder return final residual information.

4. The video encoding system according to claim 1, wherein the first video encoder and the second video encoder each select an optimal prediction result from inter-frame prediction results and intra-frame prediction results, and return the optimal prediction result.

5. The video encoding system according to claim 1, wherein the first video encoder and the second video encoder each encode a prediction residual and write the encoded prediction residual to an external register.

6. The video encoding system according to claim 1, wherein the encoding includes:
   performing inter-frame motion estimation and motion compensation to create inter-frame prediction results, utilizing an entire previous frame of the image that has been encoded as a reference frame,
   performing intra-frame encoding to create intra-frame prediction results, and
   selecting an optimal prediction result from inter-frame prediction results and intra-frame prediction results.

7. The video encoding system according to claim 1, wherein: the frame of the image is divided into a plurality of strips along a horizontal direction, where each of the predetermined number of predetermined portions includes one of the plurality of strips, and
   pixel points of a border of the first predetermined portion are located within the first video encoder and the second video encoder during encoding.

8. A video encoding system, comprising a controller, a first video encoder of a plurality of video encoders, a second video encoder of the plurality of video encoders, and a memory, where the video encoding system:
   divides a frame of an image into a predetermined number of predetermined portions, where the predetermined number of the predetermined portions is based on a number of the plurality of video encoders within the video encoding system;

retrieves from the memory, by the first video encoder of the plurality of video encoders, a first predetermined portion of the frame of the image;

retrieves from the memory, by the second video encoder of the plurality of video encoders, a second predetermined portion of the frame of the image;

encodes, by the first video encoder, the first predetermined portion of the frame of the image to create a first encoded portion of the frame of the image, wherein during the encoding of the first predetermined portion of the frame of the image by the first video encoder, a value of an image height and width register used by the first video encoder is set based on a height and width of the first predetermined portion of the frame of the image, and a value of a macro block (MB) position register used by the first video encoder is set based on a position of a macro block in the image;

encodes, by the second video encoder, the second predetermined portion of the frame of the image to create a second encoded portion of the frame of the image different from the first encoded portion of the frame of the image, wherein during the encoding of the second predetermined portion of the frame of the image by the second video encoder, a value of an image height and width register used by the second video encoder is set based on a height and width of the second predetermined portion of the frame of the image, and a value of a macro block (MB) position register used by the second video encoder is set based on the position of the macro block in the image;

writes, by the first video encoder, the first encoded portion of the frame of the image to the memory; and writes, by the second video encoder, the second encoded portion of the frame of the image to the memory.

9. The video encoding system according to claim 8, wherein the first video encoder and the second video encoder each perform inter-frame motion estimation and motion compensation on a respective portion of the frame of the image, utilizing an entire previous frame of the image that has been encoded as a reference frame.

10. The video encoding system according to claim 8, wherein the first video encoder and the second video encoder each perform intra-frame encoding utilizing a respective portion of the frame of the image, and return final residual information.

11. The video encoding system according to claim 8, wherein the first video encoder and the second video encoder each select an optimal prediction result from inter-frame prediction results and intra-frame prediction results, and return the optimal prediction result.

12. The video encoding system according to claim 8, wherein the first video encoder and the second video encoder each encode a prediction residual and write the encoded prediction residual to an external register.

13. The video encoding system according to claim 8, wherein:

during an encoding of the first predetermined portion of the frame of the image by the first video encoder, a value of a macro block (MB) position register used by the first video encoder is set based on a position of a macro block in the image, and during an encoding of the second predetermined portion of the frame of the image by the second video encoder, a value of a macro block (MB) position register used by the second video encoder is set based on the position of the macro block in the image.

14. A video encoding method, comprising:

dividing a frame of an image into a predetermined number of predetermined portions, where the predetermined number of the predetermined portions is based on a number of a plurality of video encoders within a video encoding system;

sending, from a controller to a first video encoder of the plurality of video encoders, a command to encode a first predetermined portion of the frame of the image;

sending, from the controller to a second video encoder of the plurality of video encoders, a command to encode a second predetermined portion of the frame of the image separate from the first predetermined portion of the frame of the image;

retrieving from a memory, by the first video encoder, the first predetermined portion of the frame of the image;

retrieving from the memory, by the second video encoder, the second predetermined portion of the frame of the image;

encoding, by the first video encoder, the first predetermined portion of the frame of the image to create a first encoded portion of the frame of the image, wherein during the encoding of the first predetermined portion of the frame of the image by the first video encoder, a value of an image height and width register used by the first video encoder is set based on a height and width of the first predetermined portion of the frame of the image, and a value of a macro block (MB) position register used by the first video encoder is set based on a position of a macro block in the image;

encoding, by the second video encoder, the second predetermined portion of the frame of the image to create a second encoded portion of the frame of the image different from the first encoded portion of the frame of the image, wherein during the encoding of the second predetermined portion of the frame of the image by the second video encoder, a value of an image height and width register used by the second video encoder is set based on a height and width of the second predetermined portion of the frame of the image, and a value of a macro block (MB) position register used by the second video encoder is set based on the position of the macro block in the image;

writing, by the first video encoder, the first encoded portion of the frame of the image to the memory; and writing, by the second video encoder, the second encoded portion of the frame of the image to the memory.

15. The video encoding method according to claim 14, wherein the first video encoder and the second video encoder each perform inter-frame motion estimation and motion compensation on a respective portion of the frame of the image, utilizing an entire previous frame of the image that has been encoded as a reference frame.

16. The video encoding method according to claim 14, wherein the first predetermined portion of the frame of the image is created by dividing the frame of the image into a plurality of strips along a horizontal direction.

17. The video encoding method according to claim 14, wherein the first video encoder and the second video encoder each perform intra-frame encoding utilizing a respective portion of the frame of the image, and return final residual information.

18. The video encoding method according to claim 14, wherein the first video encoder and the second video encoder each select an optimal prediction result from inter-frame prediction results and intra-frame prediction results, and return the optimal prediction result.

\* \* \* \* \*